United States Patent

Corona et al.

Patent Number: 5,300,961
Date of Patent: Apr. 5, 1994

[54] METHOD AND APPARATUS FOR ALIGNING MULTIPLE PRINT BARS IN A SINGLE PASS SYSTEM

[75] Inventors: Stephen C. Corona, Rochester; George A. Charnitski, Fairport, both of N.Y.

[73] Assignee: Xerox Corporation, Stamford, Conn.

[21] Appl. No.: 807,931

[22] Filed: Dec. 16, 1991

[51] Int. Cl.⁵ .............. G01D 15/14; G01D 9; G01D 42

[52] U.S. Cl. ................. 346/160; 346/107 R; 313/500; 263/227; 263/231; 263/800; 250/494.1

[58] Field of Search ........... 346/155, 157, 160, 153.1, 346/107 R, 1.1; 340/753, 754, 762, 782; 362/227, 231, 800; 313/500, 501; 257/89, 98; 250/494.1

[56] References Cited

U.S. PATENT DOCUMENTS

| | | | |
|---|---|---|---|
| 4,148,042 | 4/1979 | Mutton et al. | 346/155 |
| 4,251,822 | 2/1981 | Hara et al. | 346/139 C |
| 4,590,490 | 5/1986 | Takanashi et al. | 346/1.1 X |
| 4,602,262 | 7/1986 | Milligan et al. | 346/160 |
| 4,660,059 | 4/1987 | O'Brien | 346/157 |
| 4,721,969 | 1/1988 | Asano | 346/157 |
| 4,731,542 | 3/1988 | Doggett | 250/548 |
| 4,734,788 | 3/1988 | Emmett et al. | 358/300 |
| 4,743,927 | 5/1988 | Sasaki | 346/160 |
| 4,814,667 | 3/1989 | Tanaka | 313/500 |
| 4,821,066 | 4/1989 | Foote, Jr. et al. | 355/14 R |
| 4,829,326 | 5/1989 | Emmett et al. | 346/157 |
| 4,912,491 | 3/1990 | Hoshino et al. | 346/160 |
| 4,953,104 | 8/1990 | Yeh et al. | 346/157 X |
| 4,956,662 | 9/1990 | Sakai et al. | 355/27 |
| 4,965,597 | 10/1990 | Ohigashi et al. | 346/157 |
| 4,967,192 | 10/1990 | Hirane et al. | 340/811 |
| 5,003,494 | 3/1991 | Ng | 346/157 X |
| 5,040,003 | 8/1991 | Willis | 346/157 |
| 5,047,789 | 9/1991 | Kanayama et al. | 346/108 |
| 5,083,141 | 1/1992 | Taguchi et al. | 346/108 |
| 5,083,144 | 1/1992 | Altmann | 346/157 |
| 5,128,696 | 7/1992 | Watanabe | 346/155 |
| 5,140,340 | 8/1992 | Stephenson | 346/1.1 |
| 5,175,570 | 12/1992 | Haneda et al. | 346/160 |

FOREIGN PATENT DOCUMENTS

239390A 9/1986 German Democratic Rep. .
1344695A 10/1987 U.S.S.R. .

*Primary Examiner*—Benjamin R. Fuller
*Assistant Examiner*—Randy Gibson

[57] ABSTRACT

An image bar recording system, which, in a preferred embodiment, utilizes a plurality of LED image bars to provide a plurality of latent images which may subsequently be developed in different colors. The print bars are initially aligned so that each color image is precisely registered at the same relative position along the exposed area of a photoreceptor belt. The alignment is accomplished by adding non-image fiduciary pixels to the ends of each print bar and by forming a pair of opposed alignment apertures in the surface of the belt. Y-axis alignment of the print bars is accomplished by detecting edge locations of a first pixel and using this location to select a centrally located fiduciary pixel. The X-axis alignment is then obtained by rotating the print bar to bring a second selected image pixel into alignment as sensed through a second aperture. Once the initial X and Y-axis alignments are complete, subsequent alignment is maintained through subsequent passes by checking the positions of the previously identified pixels as they advance past additional lead edge apertures formed in the process direction along the belt surface.

18 Claims, 5 Drawing Sheets

METHOD AND APPARATUS FOR ALIGNING MULTIPLE PRINT BARS IN A SINGLE PASS SYSTEM

BACKGROUND OF THE INVENTION

The present invention relates to registration of plural image exposures formed on a photoreceptor belt by a plurality of image print bars and, more particularly, to a method and apparatus for aligning the image print bars relative to each other so that they are aligned in the scan and process directions to form registered color images in a single pass.

Image print bars used in xerographic recording systems are well known in the art. The print bar generally consists of a linear array of a plurality of discrete light emitting sources. Light emitting diode (LED) arrays are preferred for many recording applications. In order to achieve high resolution, a large number of light emitting diodes, or pixels, are arranged in a linear array and means are included for providing a relative movement between the linear array and a moving photoreceptor so as to produce a scanning movement of the linear array over the surface of the photoreceptor. Thus, the photoreceptor may be exposed to provide a desired image one line at a time as the LED array is advanced, relative to the photoreceptor either continuously or in stepping motion. Each LED in the linear array is used to expose a corresponding area in the photoreceptor to an exposure value defined by video data information applied to the drive circuits of the print bars.

In a color xerographic system, a plurality of LED print bars are positioned adjacent to the photoreceptor surface and selectively energized to create successive image exposures, one for each of the three basic colors. A fourth print bar may be added if black images are to be created as well.

FIG. 1 shows a prior art, single pass, color printing system having three exposure stations 10, 12, 14, each station including an LED print bar 10A, 12A, 14A. Each print bar is selectively addressed by video image signals processed through control circuit 15 to produce a modulated output which is coupled through a respective gradient index lens array 10B, 12B, 14B onto the surface of previously charged photoreceptor belt 16. The length of belt 16 is designed to accept an integral number of full page image areas $I_1-I_n$, represented by dashed lines. Upstream of each exposure station are charge devices 18, 20, 22 which place a predetermined electrical charge on the surface of belt 16. As the belt moves in the indicated direction, each image area moves past each of the imaging bars, with each bar providing its own exposure pattern in response to the video data input. The exposure pattern begins when the leading edge of the image area reaches a transverse start-of-exposure line represented by a dashed arrow 23. The exposure pattern is formed of a plurality of closely spaced transverse scan lines 24 shown with exaggerated longitudinal spacing on image area 11. Downstream from each exposure station, a development system 26, 28, 30 develops a latent image of the last exposure without disturbing previously developed images. A fully developed color image is then transferred by means not shown to an output sheet. Further details of xerographic stations in a multiple exposure single pass system are disclosed in U.S. Pat. No. 4,660,059, whose contents are hereby incorporated by reference.

With such a system as that disclosed in FIG. 1, each color image $I_1-I_n$ must be precisely aligned such that all corresponding pixels in the image areas are registered. Current requirements call for registration tolerances of approximately 125 microns (0.005 inch). The print bar alignment requirements are for the pixels of each bar to be aligned in the transverse or Y-direction of FIG. 1 as well as the process or X-direction. This alignment must be maintained through continuous revolutions (passes) of the photoreceptor.

The main cause of potential print bar misalignment is due to belt conicity in the photoreceptor belt. Belt conicity is created when the two ends of the photoreceptor sheet are welded together to form the belt, causing the two belt edges, 1 and 2 to be of slightly different lengths and imparting a conical configuration to the belt. This would create a situation, referring to FIG. 1, wherein the leading edges of images $I_1$, $I_2$, $I_3$ would rotate as they translate from one position to the next, since the linear surface velocity of a point near the "base" of the belt is traveling at a greater linear surface velocity than a point near the apex. If images $I_2$, $I_3$ are to be perfectly registered with image $I_1$, the leading edges must not be parallel to each other but must accommodate the rotation induced by the conicity of the belt. Since the degree and direction of the conicity of the belt varies from belt to belt, each set of print bars must be individually aligned to correct for the initial misregistration. Once the print bars are correctly aligned, other causes of misregistration, such as thermal expansion and vibration-induced wobble, must also be identified and corrected.

According to the present invention, a method and apparatus is provided for initially aligning multiple print bars in a single pass printing system, so that each bar is first aligned along the transverse or Y-axis and then along the process or X-axis, so as to compensate for the belt conicity and other registration errors. After these alignments, the images formed by each print bar will be in proper registration within the prescribed tolerances. This initial alignment is enabled by modifying the standard print bar design by adding a number of fiduciary (alignment) pixels at each end of the image bar extending outside of the image-forming, central area of the print bar. The term "fiduciary pixels" is intended to suggest that there is a predefined, positional relationship between the fiduciary pixels and the other LED pixels comprising the print bar so that the position of any pixel can be known with great accuracy. These specially designed image bars are first aligned in the transverse or Y-direction by sensing the position of a designated fiduciary pixel through an aperture formed in one edge of the belt. The rotational alignment in the X-direction, also referred to as a skew alignment, is made by sensing a corresponding fiduciary pixel at the opposite end of the image bar, through a second aperture which extends transversely and is opposite to the first aperture on the photoreceptor belt, the location of the two fiduciary pixels being a known distance apart.

Each image bar is aligned in the same manner. Following initial alignment, further alignment is accomplished by monitoring the position of the two previously designated fiduciary pixels and modifying the bar position in response to detection of misregistration signals. More particularly, the present invention relates to an imaging system for forming multiple image exposure frames on a photoconductive member during a single pass including:

a photoreceptor belt adapted to accommodate the formation of an integral number of image exposure frames, said belt having a first and second alignment aperture on opposite sides of the belt width and outside of the exposure frame, a plurality of linear image print bars, each print bar associated with the formation of one of said image exposure frames, each print bar having a central portion of light emitting pixels which are selectively activated to form said image exposure areas and first and second end portions of light emitting pixels outside of said exposure area which are selectively activated for print bar alignment and registration purposes, a first and second detecting means associated with said first and second end portions, respectively, for detecting the position of selected ones of said first and second end pixel end portions when said end portions are visible through said alignment aperture, and means for moving each of said print bars in a transverse direction to establish a transverse registration for each bar and means for rotating the print bar until the detected position signals from said first and second detecting means are concurrent.

DESCRIPTION OF THE INVENTION

Referring again to FIG. 1, LED print bars 10A, 12A, 14A are conventional LED print bars with a resolution of 600 spots per inch (600 spi), and a pixel size of $30 \times 40$ microns on 42.33 micron centers. In an application where an 8.5 inch wide informational line is to be exposed, a linear array of approximately 4992 pixels, arrayed in a single row, would be required. According to a first aspect of the present invention, the print bars of the prior art are modified by adding a number of additional emitters or pixels to each end of the LED print bar, as shown in FIG. 2. Thus, each print bar will have a central group of pixels which form the scan line in an image area, while the two end groups of pixels outside the image exposure area are used for alignment and registration purposes as will be seen. These additional pixels are used in conjunction with alignment apertures formed on the belt outside the image zone.

The process direction registration, or lead edge registration, will be determined by sensing the edge of the alignment aperture and writing onto the photoreceptor at some specific time later. Each possible pitch on the photoreceptor will have an aperture positioned at the beginning of that pitch. As the edge of the apertures line up with the LED print bar and a sensor is exposed to the image beam, a signal will be sent to a controller and the writing of the image will commence at a finite time span later. This finite time span will be the same for all print bars since the exact position of each print bar is being sensed.

Figure 1:
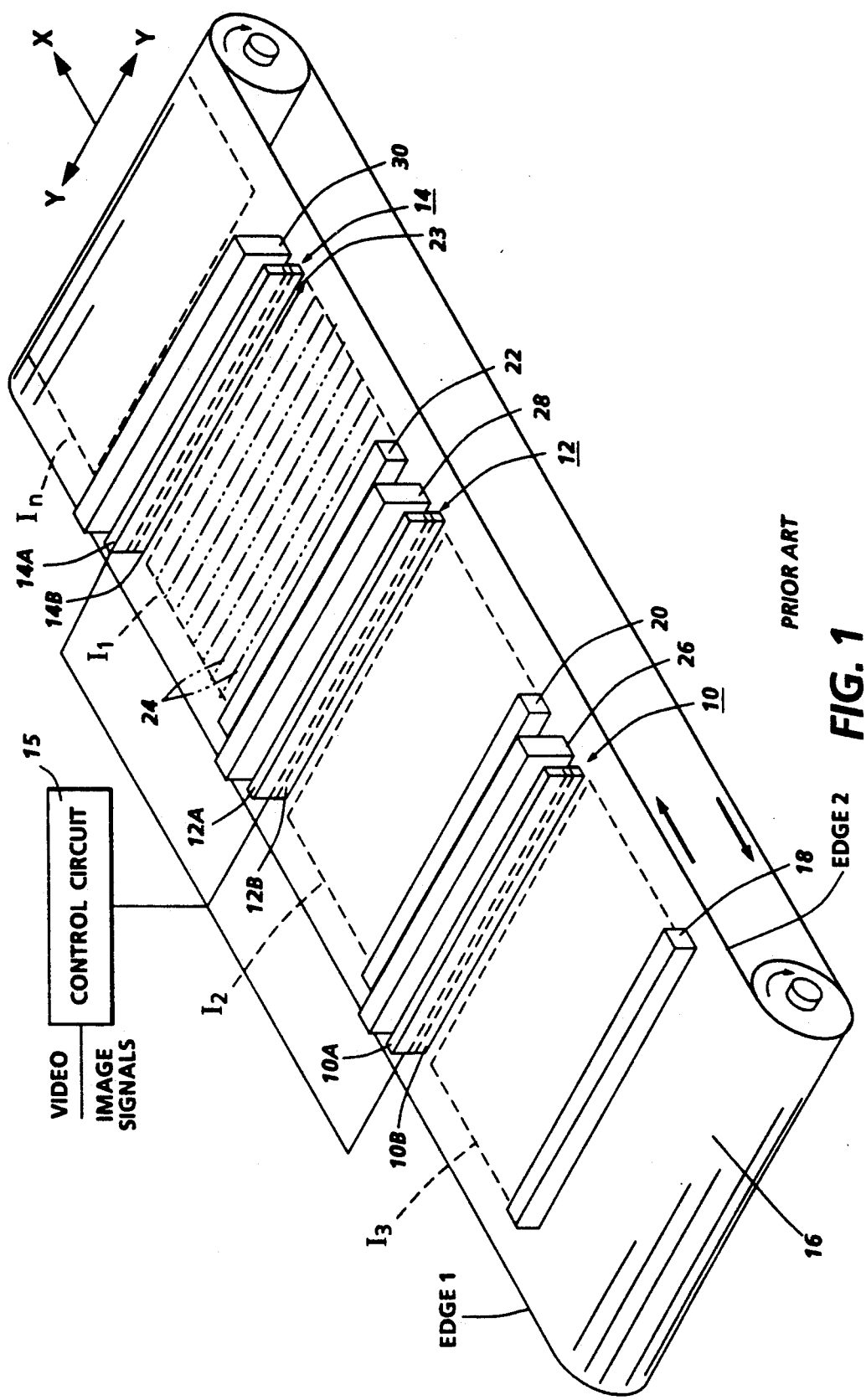
FIG. 1 shows a top perspective view of a prior art multi-print bar printing system.
Figure 2:
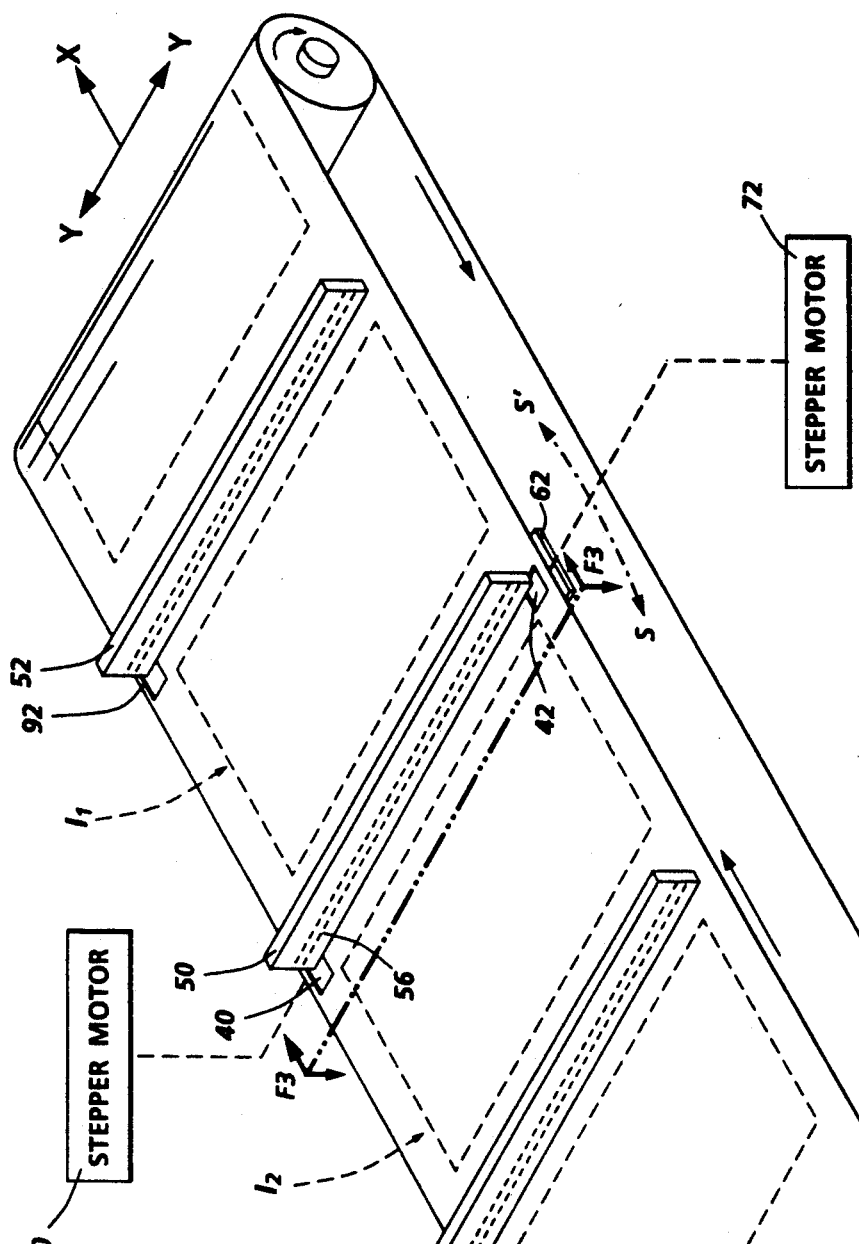
FIG. 2 shows a printing system utilizing the modified print bars and a modified photoreceptor belt, according to the present invention.
Figure 3:
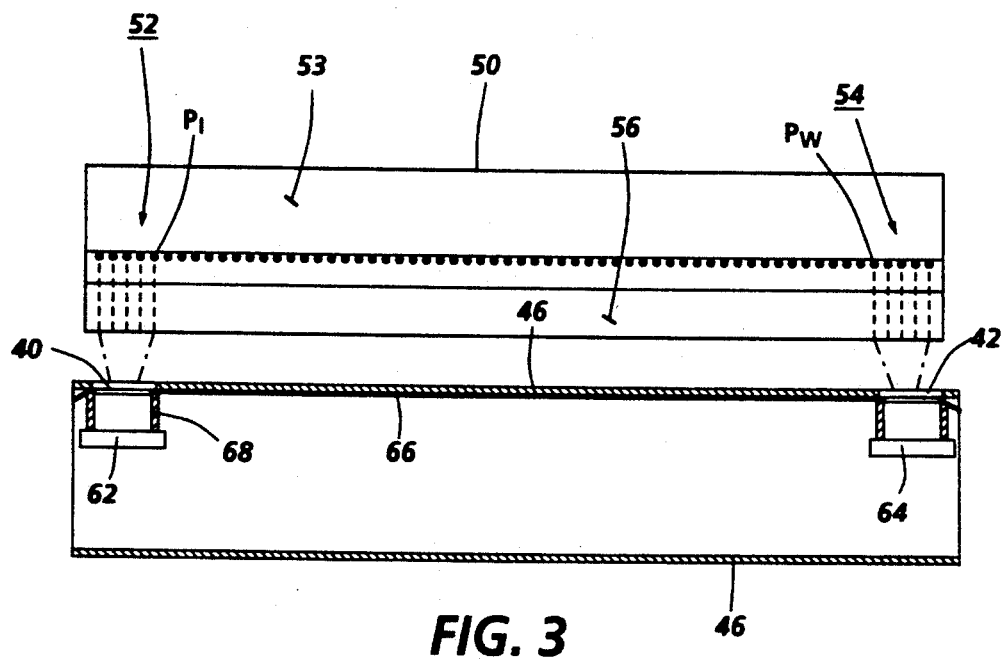
FIG. 3 is a side sectional view of one of the print bars of FIG. 2 showing a position sensor array used to detect the positions of alignment fiduciary pixels.

Referring now to FIG. 2, the system of FIG. 1 has been modified by forming alignment apertures 40, 42 in the surface of belt 46 at opposite ends of the belt in the Y or transverse direction, forming an Imaginary reference line there between. The apertures in a first embodiment are square shaped, but may be circular or, as will be seen, can assume a Z shape in a second embodiment of the invention. The apertures may also be replaced by transparent windows formed in the web surface. The apertures are formed to be outside of the image areas. Image print bars 48, 50, 52 are modified to extend past the write length by adding fiduciary alignment pixel groups to both ends of the bar. The charge and development stations have been omitted for purposes of clarity. Also omitted is the control circuit for energizing the print bars. The controls are conventional circuits such as disclosed, for example, in U.S. Pat. No. 4,967,192, whose contents are hereby incorporated by reference. In an initial alignment procedure, a first image print bar 50, shown in side view in FIG. 3, is selectively addressed to activate two groups of fiduciary pixels 52, 54, which have been added to each end of the print bar. Each group 52, 54 may, for example, include 128 pixels on a single chip, the chip being butted next to the inboard and outboard segments of the central pixel group 53. The print bar may alternatively be formed to have a longer than conventional write length. Fiduciary pixel groups 52, 54, in the preferred embodiment, have higher resolution than the centrally located exposure pixels to thereby provide greater positional sensitivity. For other systems, the fiduciary pixels may have output radiations different in wavelength from the central group; e.g. may be in the IR region. The fiduciary pixels produce a light output which is focused by a linear gradient index lens array 56 onto the surface of photoreceptor belt 46. Opposite each fiduciary pixel group 52, 54, and beneath the belt surface, is a linear position sensor array 62 and a light sensor 64, respectively. The sensor arrays are mounted to a bail bar 66, which extends the width of the photoreceptor belt in the transverse direction and serves to position the detectors along an optical center line formed by the pixel outputs. The ball bar also serves to slightly flex the belt upward along the tangential interface to provide a fixed focal distance to the selfoc lens array. The position sensor array in a preferred embodiment is a linear CCD array with a positional accuracy of $\pm 5\mu$ or better. The light sensor array 64 can be a PIN type silicon photodetector.

Figure 5:
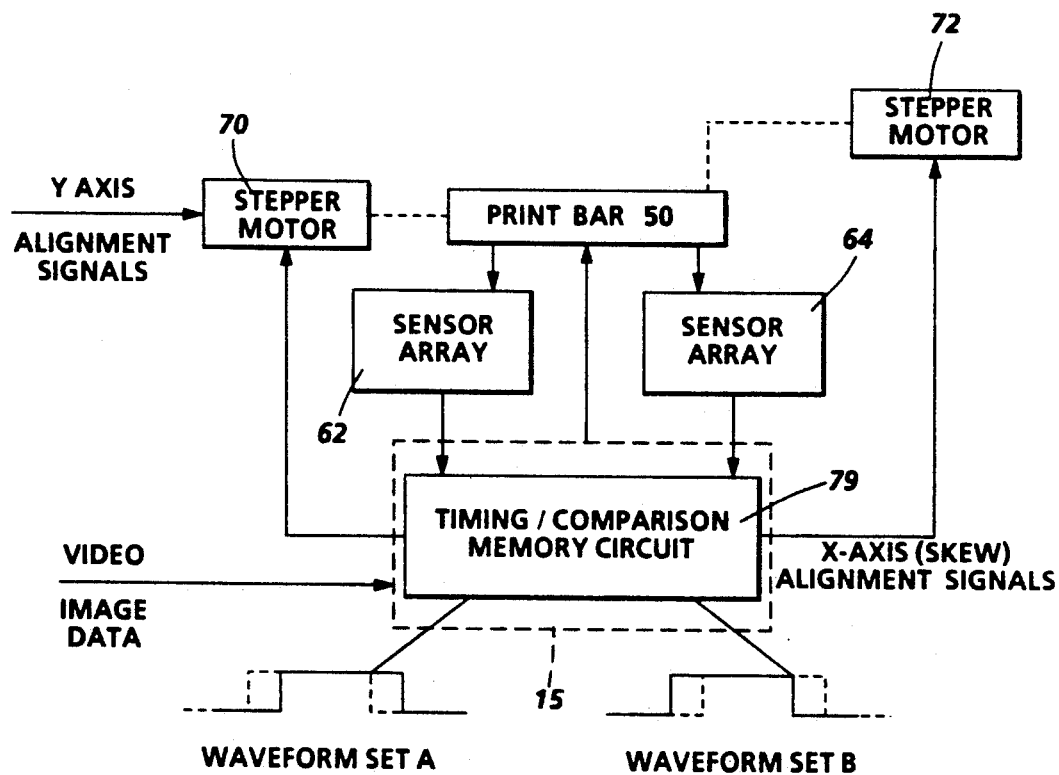
FIG. 5 is a circuit block diagram of the alignment circuitry.

Continuing with the alignment procedure, and referring to FIGS. 2, 3, and 5, belt 46 is moved until image line 50A (the active write length formed by the illuminated pixels of LED image bar 50) extends across the approximate center of aperture 40. Belt 46 is stopped at this position and a transverse, or Y-axis alignment, is accomplished.

Figure 4:
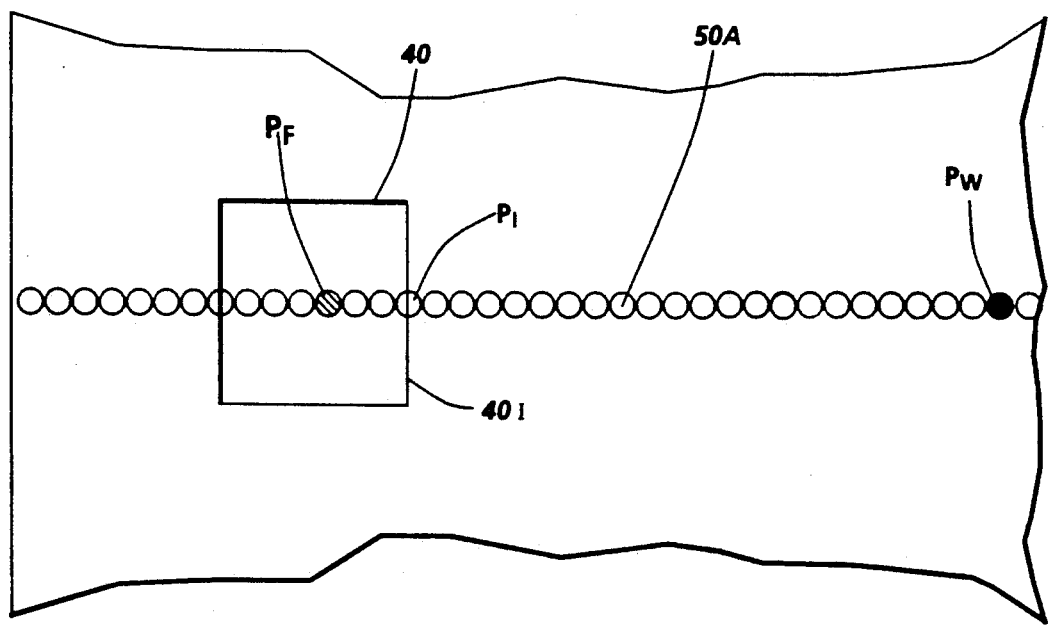
FIG. 4 is an enlarged view of a width section of the belt showing the establishment of transverse alignment fiduciary pixels.

Referring particularly to FIGS. 3 and 4, the pixels in pixel group 52 (in actuality, there will be many more pixels than those shown) are sequentially activated starting from the left (outboard) side while observing the signal from sensor array 62. When a signal is present, the pixels are illuminating the sensor array through aperture 40. When the signal disappears, or diminishes, it is known that the particular pixel being illuminated is at the inboard edge of aperture 40. The sequential pixel activation is stopped, leaving the last illuminated pixel in the "on" state. The lateral position of print bar 50 must now be adjusted to establish a reference position for this, and subsequent illuminated pixels. The lateral adjustment is accomplished by moving the bar 50 in very fine increments along the Y-axis using, for example, stepper motor 70, shown schematically in FIGS. 5. The motor should provide fine increments (1/6000 inch) of motion. In this example, the reference location for the illuminated pixel will be such that sensor array 62 detects 50% of the illumination of that pixel. Print bar 50 would be moved so that the illuminated pixel (PI) is centered on the inboard edge (401) of aperture 40, as shown FIG. 4. Pixel $P_1$ is turned off and another pixel, $P_F$ (called a fiduciary pixel) approximately centered in aperture 40 is turned on. This position of pixel $P_F$ is stored in memory circuit 79 (FIG. 5). The lateral adjustment of print bar 50 is completed by incrementing to the right (inboard) side along line 50A a preset number of pixels to establish pixel $P_W$, which will be the first pixel of the write zone to accept print data.

The remaining print bars 48, 52, are transversely aligned in the same manner by moving belt 46 until aperture 40 is centered beneath the respective image bar and the above adjustment repeated. During subsequent normal machine operation, the position of the fiduciary pixel established for each print bar can be monitored using sensor array 62 to sense the location of the fiduciary pixel through aperture 40 and transverse alignment readjustments can be made if required.

Continuing next with the process or skew alignment, the belt 46 is moved through a revolution until apertures 40, 42 pass beneath pixel groups 52, 54. The waveform outputs are detected by arrays 62, 64. The array outputs are monitored in timing/comparison circuit 79 (FIG. 5). The waveforms can have three orientations; two out of phase and one in phase. As shown in waveform set A, if the first signal is detected by array 62 (shown dotted), followed in time by the signal from detector 64, a skew adjustment signal is required to rotate the end of print bar 50 in a direction opposite the process direction, (direction S in FIG. 2) until the two waveforms are sensed simultaneously. This rotational motion is accomplished by applying signals to stepper motor 72. Stepper motor 72 may have, for example, a 50:1 gear reduction and approximately a 28 thread/inch screw. This provides 1 micron motion/motor step resolution. Similarly, if waveform set B (FIG. 5) is generated, the rotation error is in the other direction, and bar 50 is rotated in the S' direction until the two waveforms are coincident. Print bar 50, at this point, is precisely aligned, both in the transverse and in the process direction, to an imaginary reference line formed by the lead edge or by the trail edge of apertures 40, 42. As a precaution, the Y-axis alignment step can be repeated to ensure that the skew adjustment has not affected the initial Y position adjustment.

The above skew alignment procedure is repeated for the remaining print bars 48, 52, advancing the same aperture pair into alignment with the next print bar fiduciary pixel groups. Each print bar is then aligned in the same manner, each print bar having an associated stepper motor. At the end of the initial alignment, all print bars are aligned with respect to the aperture pair. Thus, in operation, as the lead edge of apertures 40, 42 line up with the print bar and sensors 62, 64, a signal will be generated within memory circuit 79 and a write signal applied by controller 15 to LED bars 48, 50, and 52 after a finite time interval. The time interview will be the same for al the image bars, since the exact position of each bar is being sensed.

According to a second aspect of the invention, additional image zone apertures 90, 92 (FIG. 2) are formed at intervals in the process direction of belt 46, outside of the image zone area and slightly upstream from the start of each image area. The apertures align precisely with aperture 40 in the process direction and define the lead edge of an image frame in the Y-direction. Illumination by a pixel within the view of array 62, is used to initiate an image page sync signal. Because the absolute photoreceptor position is sensed, the absolute distance between the print bars is of lesser importance and thermal expansion of the mounting mechanism between the print bars does not affect performance.

According to a still further aspect of the invention, following initial alignment of the print bar and during normal operation, the alignment apertures pairs 40, 42 will pass beneath each print bar once per cycle. The Y and X axis position is verified, as described above, by comparing timing output waveforms of central fiduciary pixels previously stored in circuit 79, as detected by each of the associated detectors. Any change in initial alignment, due to temperature variation, system vibrations, or the like, will result in a registration error signal being generated in circuit 79 and an error signal Is sent to the appropriate stepper motor 70, 72 to correct for the transverse or the process direction deviation, respectively.

In a variation of the above described initial alignment procedure, one skew position stepper motor may be eliminated by accepting an initially set skew position for one of the print bars and then adjusting the skew of the remaining print bars, such that the time difference of the signals from each pair of print bar detectors is equal. As an example, if print bar 50 is absent a skew position stepper motor 72, signals from arrays 62 and 64 result in, for example, waveform A in FIG. 5. Remaining print bars 48 and 52 are aligned in the Y-axis, and the skew alignment is made to make the waveform outputs of the associated detector pairs coincident with the waveform output of the print bar 50 pair. The print bars are then aligned to each other, but not to the line formed between the alignment apertures. Small differences in the absolute tangential angle can probably be tolerated in most systems.

Figure 6:
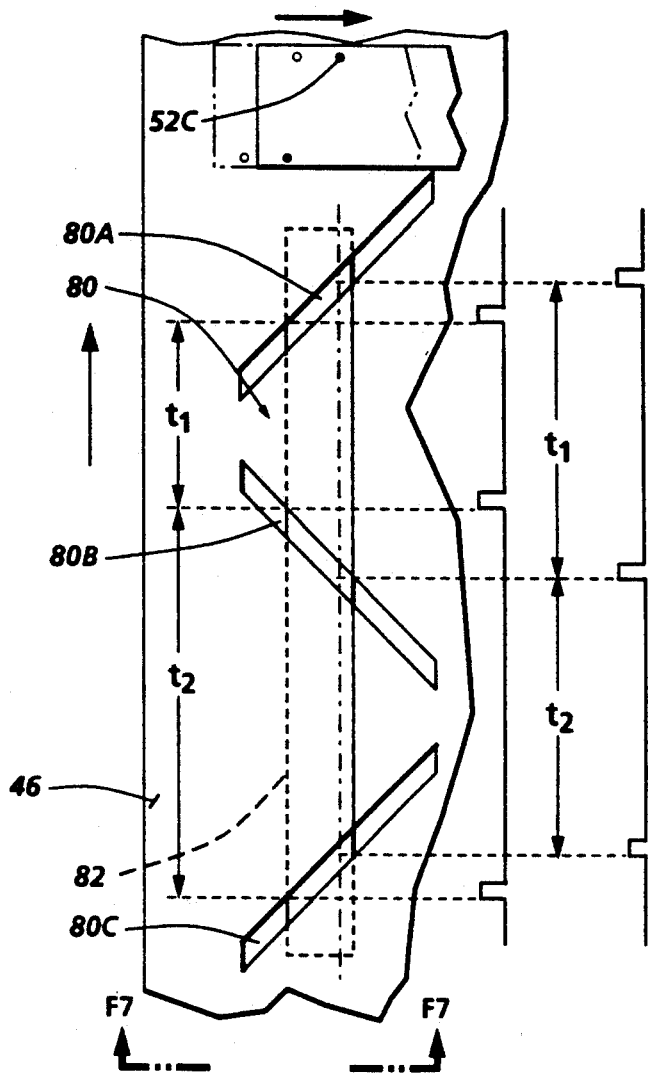
FIG. 6 shows an alternate Y-axis alignment aperture in the photoconductor belt.
Figure 7:
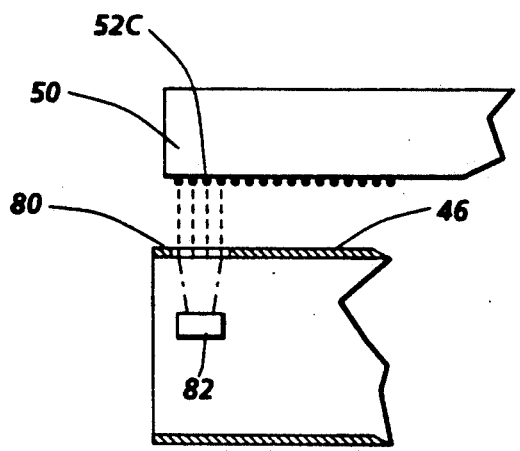
FIG. 7 shows a side view of the aperture shown in FIG. 6.

According to a second embodiment of the invention, the Y-axis registration is accomplished by utilizing a "Z" shaped aperture 80 in the photoreceptor (FIG. 6), rather than the square or circular aperture described in the first embodiment. A further change is to replace the linear position arrays with a less expensive light detector 82 which can be a PIN type silicon detector. Referring to FIGS. 6 and 7, a fiduciary pixel $P_F$, within the view of aperture 80, turned on and the photoreceptor moving, the signal, as seen at detector 82, will be three voltage spikes, caused by the three angled slots, 80A, 80B, 80C, forming aperture 80. The time between the first two spikes, which defines time, $t_1$, and the time between the second two spikes, $t_2$, will determine the lateral position of the print bar 50 with respect to Z hole pattern 80. Under nominal conditions, $t_1$ and $t_2$ will be the same when the fiduciary pixel $P_F$ traverses the center of the Z hole pattern. When the fiduciary pixel is off center, $t_1$ will be different than $t_2$ and the difference value will indicate the deviation from the center and the sign of the difference will indicate in what direction; e.g. is $t_1 > t_2$ or is $t_1 < t_2$. In FIGS. 7 and 8, the dotted path shows the pixel path resulting in $t_1 < t_2$. The correction would be to move bar 50 to the right, until the path is centered (solid line) and $t_1 = t_2$. The intent Is to align all the print bars to the same Z hole pattern, thus aligning them to each other and to the velocity vector of the photoreceptor. The specific alignment of print bar 50 would be as follows: The fiduciary pixel $P_F$ of the print bar being aligned is activated prior to aperture 80 arriving and $t_1$ and $t_2$ will be measured. If the time difference between $t_1$ and $t_2$ indicates greater than one pixel width error, a different fiduciary pixel will be illuminated so that it is near the center of the Z hole. This is done electronically using pixel jumping, and then the print bar will only have to be physically moved in subpixel dimensions to exactly center the fiduciary pixel with the Z hole. These adjustments to the print bar will be made while the belt 46 is moving, and before the Z aperture 80 arrives for the next pass. At successive passes, the lateral registration can be measured/verified and adjustments made accordingly. This procedure is repeated for the remaining print bars.

This procedure can also work with reflective/transmissive Z mark patterns on the photoreceptor. With reflective marks, the detector is mounted on the same side of the photoreceptor as the print bar and positioned accordingly.

While the invention has been described with reference to the structures disclosed, it is not confined to the details set forth, but is intended to cover such modifications or changes as they come within the scope of the following claims.

What is claimed is:

1. An imaging system for forming multiple image exposure frame son a photoconductive member during a single pass including:

a photoreceptor belt of a selected width to accommodate a formation of an integral n umber of image exposure frames, said belt having a first and second alignment aperture on opposite sides of the belt width and outside of the exposure frames, a plurality of linear light emitting diode image print bars, each of said print bars associated with the formation of one of said image exposure frames, each of said print bars having a central portion of light emitting pixels which are selectively activated to form said image exposure areas and first and second end portions of light emitting pixels outside of said exposure areas which are selectively activated for print bar alignment and registration purposes, a first and second detecting means associated with said first and second end portions, respectively, for detecting a position of selected pixels of said first and second end portions when said end portions are visible through said first and second alignment aperture, and means for moving each of said print bars in a transverse direction to establish a transverse registration for each of said bars and means for rotating the print bars until the detected position from said first and second detecting means are concurrent to thereby establish a skew registration.

2. The imaging system of claim 1 wherein said belt includes additional apertures in process direction alignment with said first alignment aperture, said additional apertures defining the lead edges of associated image exposure frame sand wherein said first detecting means is further adapted to generate edge sync signals during printer operation.

3. The imaging system of claim 1 further including memory means, wherein said first end portion includes a predetermined fiduciary pixel which is stored in said memory means and where said first detecting means detects the position of said fiduciary pixel and generates output signals used to establish a transverse registration.

4. The imaging system of claim 3 further including a timing/comparison circuit where the outputs of said first and second detecting means are monitored in said circuit and signals generated by said circuit to rotate the print bar.

5. A method for aligning a plurality of light emitting diode image print bars which are positioned adjacent a moving photoreceptor belt so as to register multiple image exposure areas formed by said print bars in a transverse and process direction, said method comprising the steps of:

(a) providing a first transverse alignment aperture adjacent one edge of the belt outside the image exposure areas and a second skew alignment aperture adjacent an opposite belt edge and outside the image exposure areas, (b) providing each image print bar with a first fiduciary pixel grouping of light emitting elements at one end of the bar, said first grouping adapted to direct emitted light through said transverse alignment aperture upon passage of the aperture there beneath, and with a second group of light emitting elements at an opposite end of the bar, said second group adapted to direct emitted light through said process alignment aperture upon passage of the aperture therebeneath, (c) moving the photoreceptor belt until the first pixel group radiation output of a first print bar is detected by a corresponding first light sensor placed on an opposite side of the belt in light coupled relationship with said print bar, (d) moving the first print bar laterally until a centrally located fiduciary pixel of said first group s identified so as to establish a transverse alignment of the first print bar, (e) entering said fiduciary pixel into system memory, (f) moving the belt and sensing the second pixel group radiation by a second light sensor placed on an opposite side of the belt in light coupled relation with said second light emitting element group, (g) comparing the radiation sensed by said first and second sensor, (h) rotating the print bar to obtain coincidence of the radiation sensed by said first and said second sensor thereby enabling the skew adjustment, and (i) repeating steps c through h for each of said print bars.

6. The method of claim 5, wherein said aperture is defined by having an inboard edge parallel to a belt velocity vector, and wherein said first fiduciary pixel group is selectively activated from the outboard side of the group until a pixel is identified as being adjacent said inboard edge and wherein said print bar is moved laterally until said identified fiduciary pixel is moved to said reference position.

7. The method of claim 6, including the further steps of:

selecting a fiduciary pixel which is located at the approximate center of said first aperture, detecting the position of said fiduciary pixel and storing said position in memory;

identifying a start of lien exposure pixel a predetermined distance from said edge identified pixel and storing said start of line exposure pixel in memory, monitoring the subsequent several positions of said fiduciary pixel following the photoreceptive cycle, comparing the subsequent position with said stored position and generating a compensation feedback signal when a misalignment is detected, and adjusting the alignment of said print bar to restore the initial alignment position of said print bar.

8. The method of claim 5 including the further steps of:

forming additional image zone apertures in the process direction in alignment with said transverse alignment aperture, said additional apertures defining the lead edge of an associated image exposure area, and detecting passage of said image zone apertures by said first sensor array and generating an image page sync signal.

9. The method of claim 5 including the further step of maintaining registration during a printing operation by dynamically comparing signals from end sensor arrays as said alignment apertures pass beneath said print bars and adjusting the transverse and/or process position of the print bar found to be misaligned.

10. The method of claim 5 wherein said transverse alignment aperture has a Z shaped pattern defining three mutually inclined slots extending in the process direction, and including the steps of:

measuring the time between detection of the first and second slots passing beneath said fiduciary pixel to establish a first time $t_1$, measuring the time between detection of the second and third slots passing beneath said fiduciary pixel to establish a second time $t_2$, and moving the print bar in a transverse direction until $t_1$ equals $t_2$.

11. The method of claim 10 wherein said Z shaped pattern is formed of reflective material on the photoreceptor surface and the detector is positioned adjacent said pattern on the same side of the photoreceptor.

12. The method of claim 5 wherein said first light sensor is a linear position sensor array.

13. The method of claim 1 wherein the first and second apertures are formed as transparent windows in the photoreceptor.

14. In a color imaging recording apparatus for superimposing a plurality of images to be developed of different colors on one another to form a composite color image on a moving photoreceptor belt, said color image apparatus including:

a plurality of light emitting diode (LED) print bars arranged adjacent to the photoreceptor belt surface, each print bar adapted to create an exposure pattern corresponding with one of said plurality of color images, each said print bar having a plurality of centrally located emitters which are selectively energized to form latent image patterns on said bars and opposed groups of emitters containing at least one fiduciary emitter adjacent said image area emitters, said opposed groups of emitters cooperating with a pair of alignment holes formed along the Y axis of said belt to establish an initial alignment position for each print bar so that each image printed by said print bar is in registration with subsequent images.

15. A method of line-by-line exposure of a moving photoreceptor member by means of a plurality of light emitting diode image print bars, each of said bars comprising a plurality of linearly arranged light emitting pixel elements, including the steps of:

optically determining location of a fiduciary pixel outside of an exposure area and moving said print bar in a X and Y-axis until said fiduciary pixel is in a predetermined alignment position, storing the coordinates of said pixel registration in binary data format in selected memory, and monitoring a subsequent location of said print bars and detecting when said print bars are out of position and generating corrective signals to restore the initial fiduciary pixel relationship.

16. A method for compensating for image misregistration due to conicity in a photoreceptor belt moving in a process direction comprising the steps of:

forming a first and second aperture in the belt, the aperture located in non-image exposure edge areas of the belt, positioning at least a first and second linear light emitting diode (LED) image print bar in image forming position with respect to the belt, said print bar having at least one row of linearly extending light emitting pixels, including a central pixel grouping used to write successive image lines on the charged portion of the belt and end pixel groups emitting radiation outside the imaging area, one of said pixel groups having a predetermined fiduciary pixel, memory means for storing the location of said fiduciary pixel, moving the belt until the radiation from the end pixel groups is detected through said aperture by photodetecting means positioned beneath said end pixel groups, moving the first print bar, while the belt is stationary, in a transverse direction to establish a transverse axis alignment based on the detection of the fiduciary pixel, and rotating the end of the print bar in a process or reverse process direction until coincidence of output signal sis detected at both ends of the pixel groups during dynamic belt motion.

17. A linear light emitting image print bar having a central group of light emitting elements which produce a light radiation output of a first resolution, and a second and third group of light emitting elements adjacent said central group, said second and third group having light radiation outputs of a second resolution, wherein said light emitting elements comprising said central group emits light having a wavelength different from the light emitted by the light emitting elements comprising said second and third group.

18. An improved light emitting diode linear image print bar for forming exposure image areas on a charged photoreceptive surface in response to video data image inputs, the improvement wherein the print bar have at least a first row of light emitting elements, said at least first row having a central array of light emitting elements which are selectively addressed to form an exposed image area on said photoreceptor, and a second and third light emitting element array adjacent and on both ends of said central array the second and third array, containing at least one predetermined fiduciary light emitting element, being selectively addressed to produce radiation outputs outside of the image area for registration and alignment purposes.

* * * * *